(12) United States Patent
Baxter et al.

(10) Patent No.: US 11,598,432 B2
(45) Date of Patent: Mar. 7, 2023

(54) CHECK VALVE

(71) Applicant: Baxter Performance, Spokane, WA (US)

(72) Inventors: Kevin Baxter, Spokane, WA (US); Thomas Edward Brodrick, Deer Park, WA (US)

(73) Assignee: Baxter Performance, Spokane, WA (US)

( * ) Notice: Subject to any disclaimer, the term of this patent is extended or adjusted under 35 U.S.C. 154(b) by 0 days.

(21) Appl. No.: 17/547,895

(22) Filed: Dec. 10, 2021

(65) Prior Publication Data

US 2022/0186849 A1 Jun. 16, 2022

Related U.S. Application Data

(60) Provisional application No. 63/124,449, filed on Dec. 11, 2020.

(51) Int. Cl.
*F16K 15/02* (2006.01)
*F16K 15/06* (2006.01)

(52) U.S. Cl.
CPC .......... *F16K 15/025* (2013.01); *F16K 15/065* (2021.08); *F16K 15/063* (2013.01); *Y10T 137/7869* (2015.04); *Y10T 137/7871* (2015.04)

(58) Field of Classification Search
CPC ................. F16K 15/025; F16K 15/063; Y10T 137/7869; Y10T 137/7871
See application file for complete search history.

(56) References Cited

U.S. PATENT DOCUMENTS

| | | | | | |
|---|---|---|---|---|---|
| 2,245,271 | A | * | 6/1941 | Guill | F16K 17/30 137/498 |
| 2,886,061 | A | * | 5/1959 | Smith | F16K 1/303 137/601.01 |
| 3,122,162 | A | * | 2/1964 | Sands | G05D 7/0133 137/516.25 |
| 3,735,777 | A | * | 5/1973 | Katzer | F16K 17/34 137/516.29 |
| 3,794,077 | A | * | 2/1974 | Fanshier | F16K 15/063 137/513.3 |
| 3,817,267 | A | * | 6/1974 | Hicks | F16K 31/58 137/204 |
| 3,841,520 | A | * | 10/1974 | Bryant | F04D 15/0077 220/88.2 |
| 3,845,785 | A | * | 11/1974 | McMath | F16K 17/383 137/517 |

(Continued)

*Primary Examiner* — Daphne M Barry
*Assistant Examiner* — Frederick D Soski
(74) *Attorney, Agent, or Firm* — Lee & Hayes, P.C.

(57) ABSTRACT

A check valve may be used to enable desired flow rates of fluid in a particular direction. In some examples, the check valve may have a hollow cylindrical body and a threaded portion on an exterior wall of the hollow cylindrical body such that the check valve may be coupled with an assembly, such as an adapter for a vehicle engine. The check valve may include a plunger having a dome shaped portion (e.g., cone shaped, semi-hemispherical shaped, rounded cone shaped, etc.) that extends out of the hollow cylindrical body into free space when the check valve is in an open position and forms a seal with the hollow cylindrical body when the check valve is in a closed position.

17 Claims, 8 Drawing Sheets

(56) References Cited

U.S. PATENT DOCUMENTS

| | | | | |
|---|---|---|---|---|
| 3,919,991 A * | 11/1975 | Neschke | F01L 13/08 | 123/182.1 |
| 3,999,570 A * | 12/1976 | Clements | F16K 24/00 | 251/339 |
| 4,049,016 A * | 9/1977 | Henry | F16K 17/20 | 137/498 |
| 4,084,749 A * | 4/1978 | Drori | A01G 25/023 | 138/42 |
| 4,105,044 A * | 8/1978 | Davitt | F16K 15/044 | 137/517 |
| 4,195,658 A * | 4/1980 | Dierksmeier | F16K 17/30 | 137/462 |
| 4,269,215 A * | 5/1981 | Odar | B67D 7/36 | 137/460 |
| 4,425,937 A * | 1/1984 | Stein | F02B 47/00 | 137/504 |
| 4,436,111 A * | 3/1984 | Gold | F16K 17/30 | 521/902 |
| 4,456,029 A * | 6/1984 | McCrum | F16K 17/26 | 137/516.25 |
| 4,830,046 A * | 5/1989 | Holt | F16K 17/30 | 137/460 |
| 4,934,405 A * | 6/1990 | Brownfield | F16K 17/30 | 137/533.29 |
| 5,105,850 A * | 4/1992 | Harris | F16K 17/34 | 137/513.3 |
| 5,441,202 A * | 8/1995 | Wintering | B05B 15/658 | 137/107 |
| 5,613,518 A * | 3/1997 | Rakieski | F16K 17/30 | 137/513.5 |
| 5,653,257 A * | 8/1997 | Johnston | G05D 7/0133 | 138/46 |
| 6,089,474 A * | 7/2000 | Marino | A62C 31/03 | 251/351 |
| 8,047,224 B2 * | 11/2011 | Eichler | F16K 17/30 | 137/460 |
| 2004/0031524 A1 * | 2/2004 | Schulze | F16K 31/56 | 137/460 |
| 2004/0177888 A1 * | 9/2004 | Heeks | F16K 17/048 | 137/599.18 |
| 2005/0005972 A1 * | 1/2005 | Borg | F16H 61/0276 | 137/517 |
| 2005/0092368 A1 * | 5/2005 | Tahir | F16K 17/30 | 137/462 |
| 2008/0083463 A1 * | 4/2008 | Fazekas | G05D 7/0133 | 137/512.1 |
| 2008/0178946 A1 * | 7/2008 | Lea-Wilson | F16K 17/30 | 137/460 |
| 2008/0185052 A1 * | 8/2008 | Loper | F15B 20/005 | 137/517 |
| 2010/0012202 A1 * | 1/2010 | Norbert | F16K 17/30 | 137/535 |
| 2010/0154902 A1 * | 6/2010 | Loper | F15B 13/023 | 137/517 |
| 2011/0147016 A1 * | 6/2011 | Blease | A62C 35/68 | 137/517 |
| 2017/0368903 A1 * | 12/2017 | Kesler | B60H 1/00485 | |
| 2018/0112780 A1 * | 4/2018 | Rain | F16K 1/46 | |
| 2018/0339849 A1 * | 11/2018 | Tiffany, III | F16K 37/0041 | |
| 2020/0208750 A1 * | 7/2020 | Quinn | F16K 17/285 | |

* cited by examiner

CHECK VALVE

RELATED APPLICATIONS

This application claims priority to U.S. Provisional Patent Application No. 63/124,449, filed on Dec. 11, 2020, the entire contents of which are incorporated herein by reference.

BACKGROUND

Valves are used in a variety of applications, such as piping, vehicles, and machinery, to regulate, direct, or otherwise control the flow of a fluid. In some cases, it may be desirable to allow the fluid to flow in a particular direction at a particular flow rate. Due to varying viscosities of fluid and to systems downstream of the valve that may create interference to the flow of the fluid (e.g., back pressure in a system), it may be difficult to quickly and efficiently allow fluid to flow through the valve. Thus, there is a need for a valve that allows fluid to flow in a particular direction at a desired flow rate.

BRIEF DESCRIPTION OF THE DRAWINGS

The detailed description is set forth with reference to the accompanying figures. The use of the same reference numbers in different figures indicates similar or identical items.

DETAILED DESCRIPTION

Overview

Figure 1A:
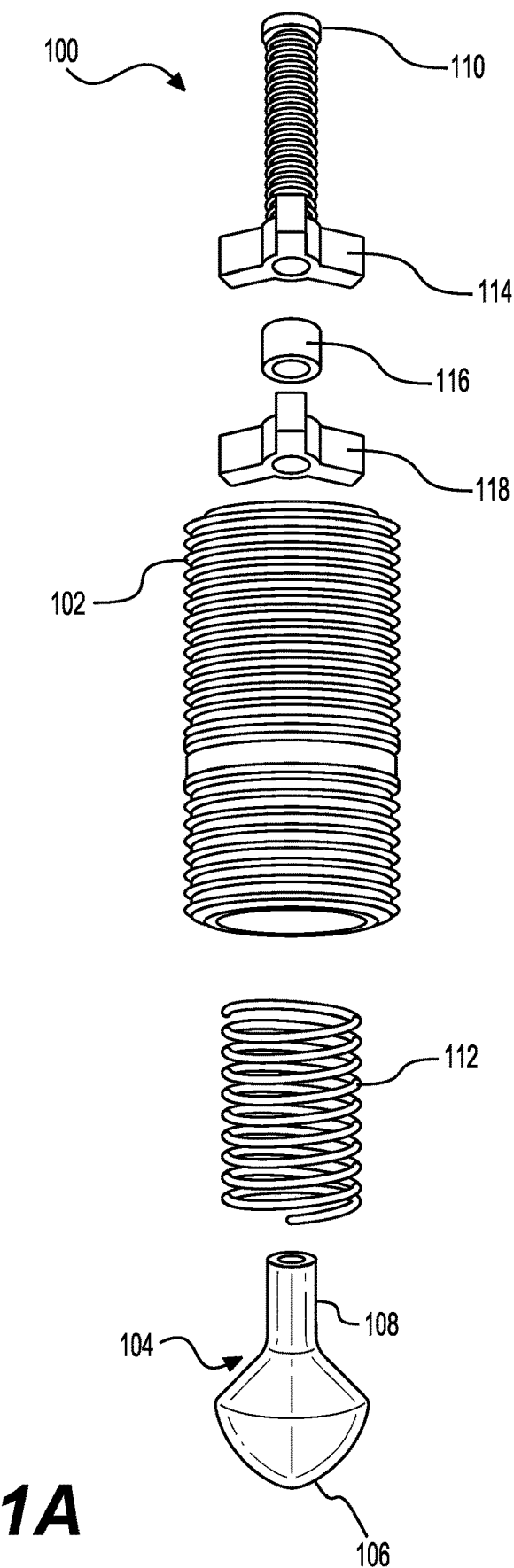
FIG. 1A illustrates an exploded view of an example embodiment of a check valve as described herein.

As discussed above, mechanical assemblies, such as those found in vehicle engines, may include systems that require fluid to flow against back pressure. For example, some vehicle engines may require oil to drain out of an oil filtration system. Back pressure in the system may cause the oil to drain slowly out of the oil filtration system when an oil change is being performed. Existing valves, such as check valves, respond to flow and pressure disturbances such as turbulence in an upstream piping system. This can result in a disc of the check valve oscillating back and forth on a pin support. When turbulence becomes severe and the oscillations are of a large enough amplitude, the disc may continually move, banging against the stop, and the pin eventually fails.

This application describes a check valve having a hollow cylindrical body and a threaded portion on an exterior wall of the hollow cylindrical body such that the check valve may be coupled with an assembly, such as an oil filter adapter for a vehicle engine. The check valve may include a plunger having a dome shaped portion (e.g., cone shaped, semi-hemispherical shaped, rounded cone shaped, etc.) that extends out of the hollow cylindrical body into free space when the check valve is in an open position and forms a seal with the hollow cylindrical body when the check valve is in a closed position. The dome of the plunger may prevent turbulence of the check valve as fluid flows through the hollow cylindrical body of the check valve and into the attached assembly.

In some cases, the plunger includes a dome shaped portion (i.e., the end that extends into free space) and a stem portion with a threaded interior configured to couple with a screw. The stem portion of the plunger may be inserted through a spring and into a first end of the hollow cylindrical body such that the stem portion and the spring are located on an interior of the hollow cylindrical body. The interior of the hollow cylindrical body may include an interior edge located approximately midway of the hollow cylindrical body that contacts the spring such that the spring may not pass through the interior of the hollow cylindrical body. In some examples, the plunger may include a tapered portion interposed between the stem portion and the dome portion such that a seat of the tapered portions is configured to seal against an opening of the hollow cylindrical body.

In some cases, the screw may be inserted through a second portion of the hollow cylindrical body and be coupled through a first triad, a spacer and a second triad. The first triad and the second triad may be sized such that they fit into the interior portion of the hollow cylindrical base but are wide enough to make contact with the interior edge. In some examples, when the plunger and the spring are inserted into the first end of the hollow cylindrical base and when the screw, the first triad, the spacer, and the second triad are inserted through the second end of the hollow cylindrical base, the spring may compress against the interior edge and the screw may couple with the threaded interior of the stem portion of the plunger. In this way, the screw may hold the plunger in a closed position while compressing the spring against the interior edge. The first triad and the second triad may keep the screw linearly aligned with the plunger (i.e., in the center of the interior of the hollow cylindrical base) so that the plunger my freely move from a closed position to an open position, and vice versa, without any pieces of the check valve getting caught on an interior wall of the hollow cylindrical base. Thus, the first triad and the second triad may prevent canting and/or binding that may otherwise prevent the plunger from retracting into a closed position. In some cases, the first triad, the spacer, and the second triad may be a single piece that may couple with the screw.

In some cases, the exterior portion of the check valve may include a thread locking mechanism located in the threaded portion of the check valve to enable the check valve to be securely locked to an assembly such that the check valve does not turn when another part is being attached or removed. The thread locking mechanism may also be unlocked when it is desirable for the check valve to turn and be removed from, or further secured to, the assembly. In some cases, the check valve may be attached to an oil filter adapter that can be used in an engine to enable an oil filter system that is designed for using cartridge oil filters to use spin-on oil filters. The oil filter adapter may be configured to attach to an oil filter housing of a vehicle, form a seal with the oil filter housing, and couple with the check valve in order to attach to a spin-on oil filter. The check valve may have a first end that attaches to the oil filter adapter and a second end that attaches to a spin-on oil filter. When the check valve is attached to the oil filter adapter, threads on an exterior of the check valve may make contact with threads that are on an interior of the oil filter adapter. As the check valve is coupled with the oil filter adapter and turned clockwise, the check valve may recede into the oil filter adapter and the exterior threads of the check valve may interlace with the interior threads of the oil filter adapter as the check valve and the oil filter adapter tighten together and are coupled. Once the check valve is coupled with the oil filter adapter, the thread locking mechanism may be adjusted such that the check valve is unable to further spin clockwise or counter-clockwise, thereby uninstalling itself from the oil filter adapter. For example, the thread locking mechanism may be an adjustable portion of the first end of the check valve that attaches to an oil filter adapter. The adjustable portion may be adjustable via a screw that extends from the second end of the check valve into the adjustable portion located in the first end of the check valve that attaches to an oil filter adapter, with a head of the screw being accessible via the second end of the check valve when the check valve is coupled with the oil filter adapter. The adjustable portion may be coupled with the screw via threads located on an interior of the adjustable portion such that, when the screw is turned clockwise, the adjustable portion moves closer to the screw head, and when the screw is turned counter clockwise, the adjustable portion moves away from the screw head. In some case, the interior portion of the adjustable portion may include spring such that when the screw is inserted through the interior of the adjustable portion, the screw may travel through the spring and as the screw is turned clockwise and/or counter clockwise, the spring may compress and/or decompress. The adjustable portion may also include threads on an exterior portion of the adjustable portion such that, when the adjustable portion is properly aligned, the threads on an exterior portion of the adjustable portion line up with the exterior threads of the check valve. When the threads on the exterior portion of the adjustable portion and the exterior threads of the check valve are aligned, the check valve may freely be installed or un-installed with the oil filter adapter (i.e., may turn freely). Once the check valve is coupled with the oil filter adapter, and it is desirable to secure the check valve to the oil filter adapter (e.g., an oil filter is needed to be installed or un-installed from the oil filter adapter), the screw head may be turned clock wise causing the adjustable portion of the check valve to move closer to the screw head. When the check valve is coupled with the oil filter adapter and the adjustable portion of the check valve moves closer to the screw head, the threads located on the exterior portion of the adjustable portion become misaligned with the threads located on the exterior portion of the check valve, which causes a tension on the threads located on the interior portion of the oil filter adapter. This tension locks the check valve in place such that any torque on the check valve, e.g., adding or removing oil filters from the second end of the check valve, does not cause the check valve to move.

Although the example provided above in which the check valve may be used pertains to an oil filter adapter, any assembly in which the flow of a fluid is desired at a particular flow rate and with minimal turbulence may utilize the check valve.

Example Check Valve

Turning now to the figures, details are provided concerning various example embodiments. In general, the embodiments disclosed in the figures are presented by way of example. The components disclosed in the figures may be combined as desired to create a check valve having various configurations. The components disclosed in the figures may be rearranged, modified, duplicated, and/or omitted in some configurations.

Figure 1B:
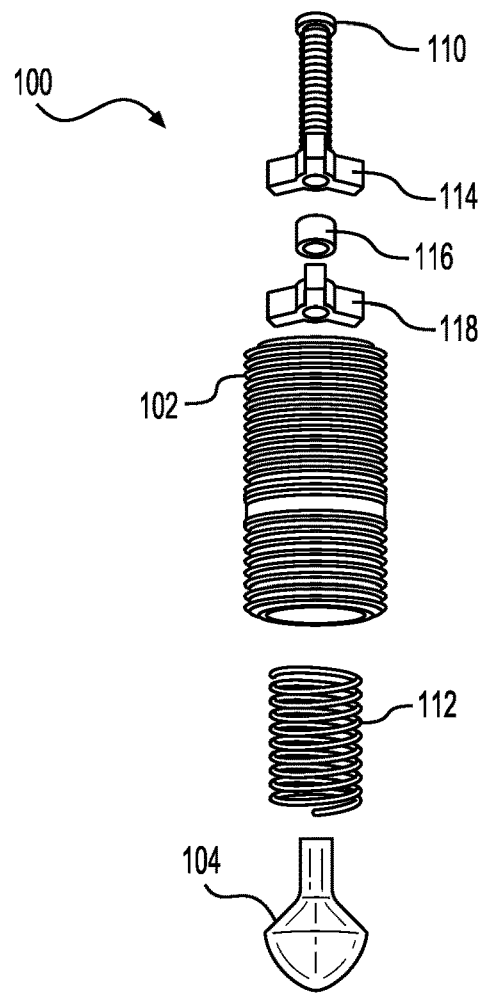
FIG. 1B illustrates an exploded view of an example embodiment of a check valve as described herein.
Figure 1B:
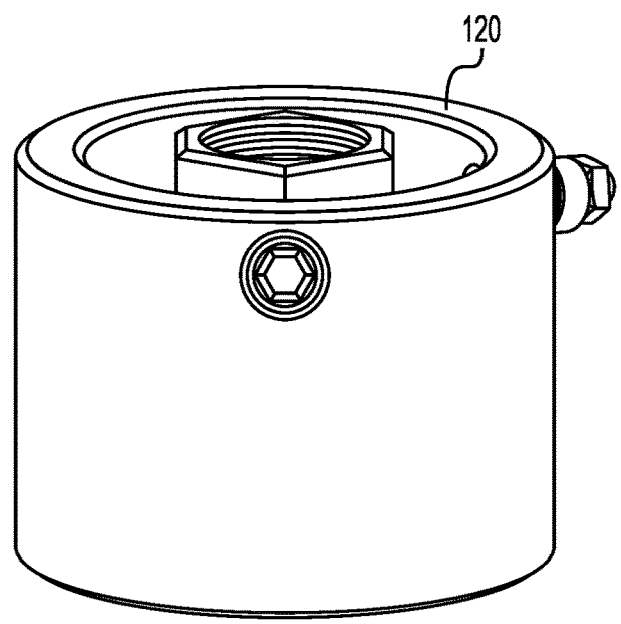
Figure 1C:
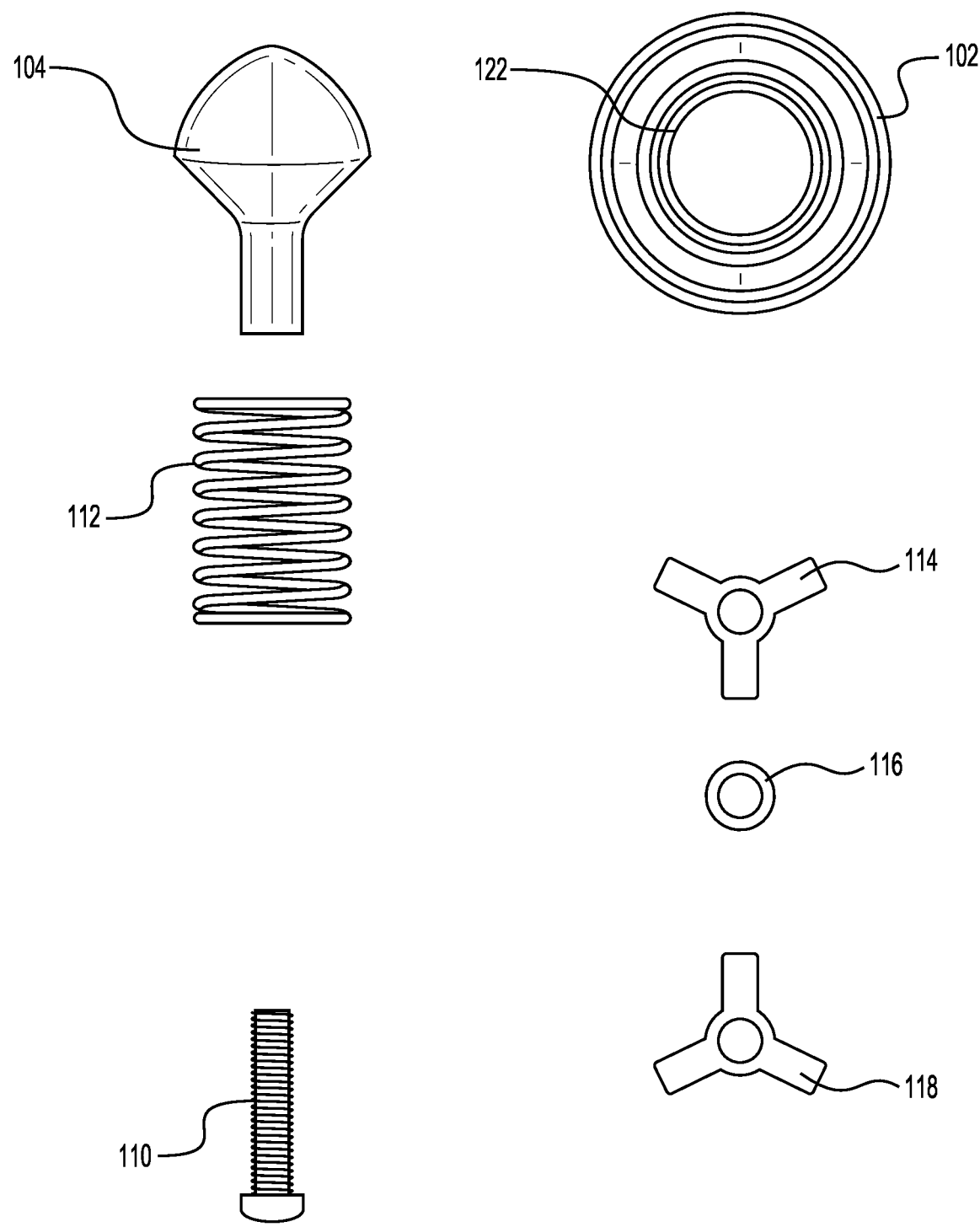
FIG. 1C illustrates an exploded view of an example embodiment of a check valve as described herein.

With reference to FIGS. 1A-1C, an exploded view of an example embodiment of a check valve 100 is illustrated having hollow cylindrical body 102 and a threaded portion on an exterior wall of the hollow cylindrical body 102 such that the check valve 100 may be coupled with an assembly, such as an oil filter adapter for a vehicle engine. The check valve 100 may include a plunger 104 that extends out of the hollow cylindrical body 102 into free space when the check valve 100 is in an open position and forms a seal with the hollow cylindrical body 102 when the check valve 100 is in a closed position.

In some cases, the plunger 104 includes a dome 106 (i.e., the end that extends into free space) and a stem portion 108 with a threaded interior configured to couple with a screw 110. The stem portion 108 of the plunger 104 may be inserted through a spring 112 and into a first end of the hollow cylindrical body 102 such that the stem portion 108 and the spring 112 are located on an interior of the hollow cylindrical body 102 (e.g., slidably disposed into the interior) and the dome 106 of the plunger is located in an interior of an assembly, such as an oil filter adapter 120, when the check valve is coupled with the assembly. The interior of the hollow cylindrical body 102 may include an interior edge 122 located approximately midway of the hollow cylindrical body 102 that contacts the spring 112 such that the spring 112 may not pass through the interior of the hollow cylindrical body 102. In some examples, the plunger 104 may include a tapered portion interposed between the stem portion 108 and the dome 106 such that a seat of the tapered portions is configured to seal against an opening of the hollow cylindrical body 102. The tapered portion may change from a first diameter of an outer circumference of the dome 106 to a second diameter of an outer circumference of the stem portion 108.

In some cases, the screw 110 may be inserted through a second portion of the hollow cylindrical body 102 and be coupled through a first triad 114, a spacer 116, and a second triad 118. The first triad 114 and the second triad 118 may be sized such that they fit into the interior portion of the hollow cylindrical body 102 but are wide enough to make contact with the interior edge 122. In some examples, when the plunger 104 and the spring 112 are inserted into the first end of the hollow cylindrical body 102 and when the screw 110 the first triad 114, the spacer 116 and the second triad 118 are inserted through the second end of the hollow cylindrical body 102, the spring 112 may compress against the interior edge 122 and the screw 110 may couple with the threaded interior of the stem portion 108 of the plunger 104. In this way, the screw 110 may hold the plunger 104 in a closed position while compressing the spring 112 against the interior edge 122. The first triad 114 and the second triad 118 may keep the screw 110 linearly aligned with the plunger 104 (i.e., in the center of the interior of the hollow cylindrical body 102) so that the plunger 104 may freely move from a closed position to an open position, and vice versa, without any pieces of the check valve 100 getting caught on an interior wall of the hollow cylindrical body 102. Thus, the first triad 114 and the second triad 118 may prevent canting and/or binding that may otherwise prevent the plunger 104 from retracting into a closed position. In some cases, the first triad 114, the spacer 116, and the second triad 118 may be a single piece that may be coupled with the screw 110.

Figure 1D:
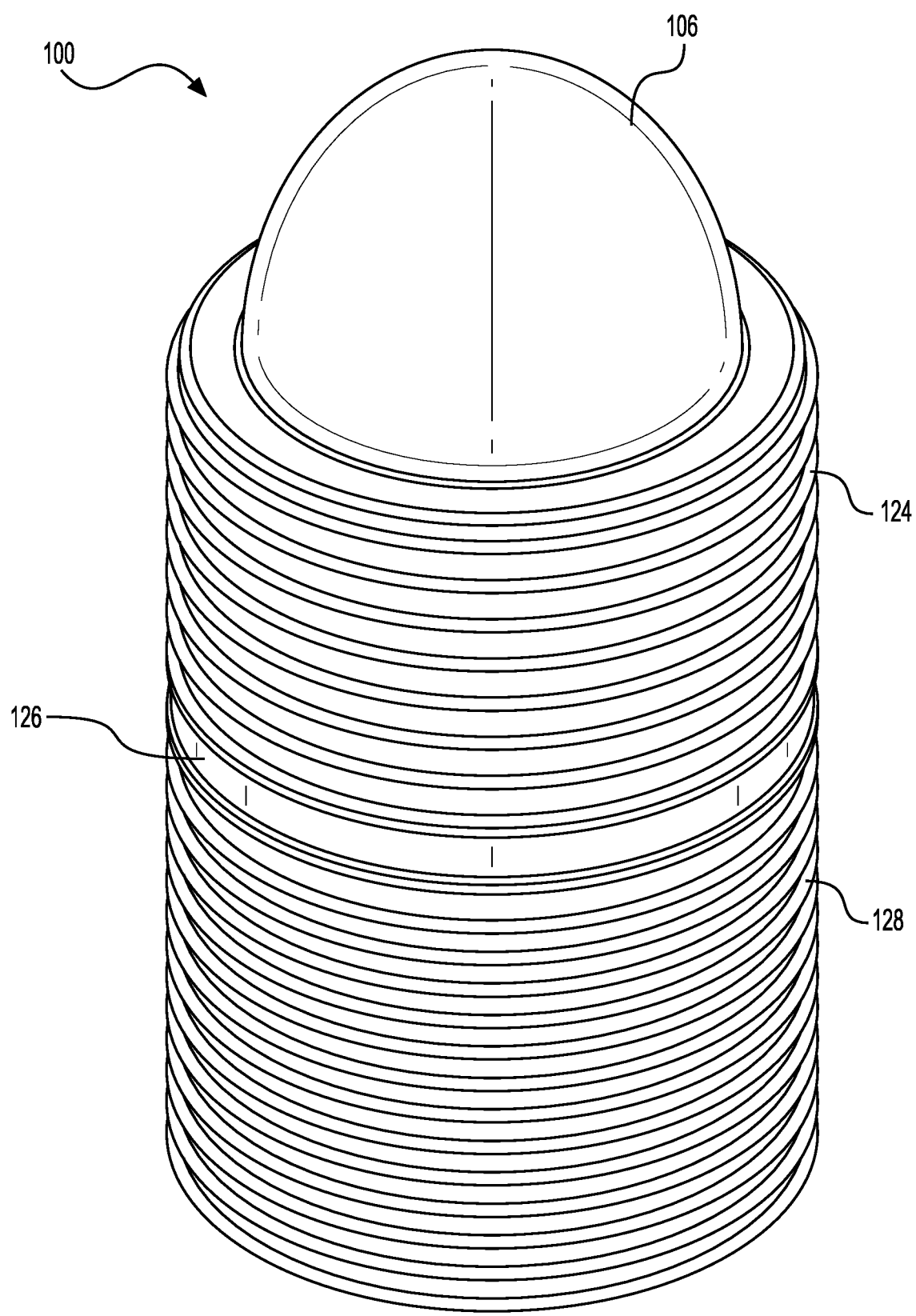
FIG. 1D illustrates a perspective view of an example embodiment of a check valve as described herein.

FIG. 1D illustrates a perspective view of an example embodiment of a check valve 100 as described herein. In some cases, the check valve 100 may include a first exterior portion 124, a second exterior portion 126, and a third exterior portion 128 of the hollow cylindrical body 102. The first exterior portion 124 may be thread such that the check valve 100 may be coupled with an assembly, such as the oil filter adapter 120, and the plunger 104 is located in an interior of the assembly. In some examples, the first exterior portion 124 may include and/or otherwise be referred to as a first longitudinal end. The second exterior portion 126 may not be a threaded surface (e.g., a smooth surface) such that when the check valve 100 is being coupled into an assembly, the second exterior portion 126 may prevent the check valve 100 from turning wholly into the assembly, thereby exposing the third exterior portion 128. When the check valve is coupled to the assembly (e.g., the first exterior portion 124 is coupled with the assembly), the third exterior portion 128 may be exposed such that a removable object, such as an oil can, may couple with the third exterior portion 128. In some examples, the third exterior portion 128 may include and/or otherwise be referred to as a second longitudinal end.

Figure 1E:
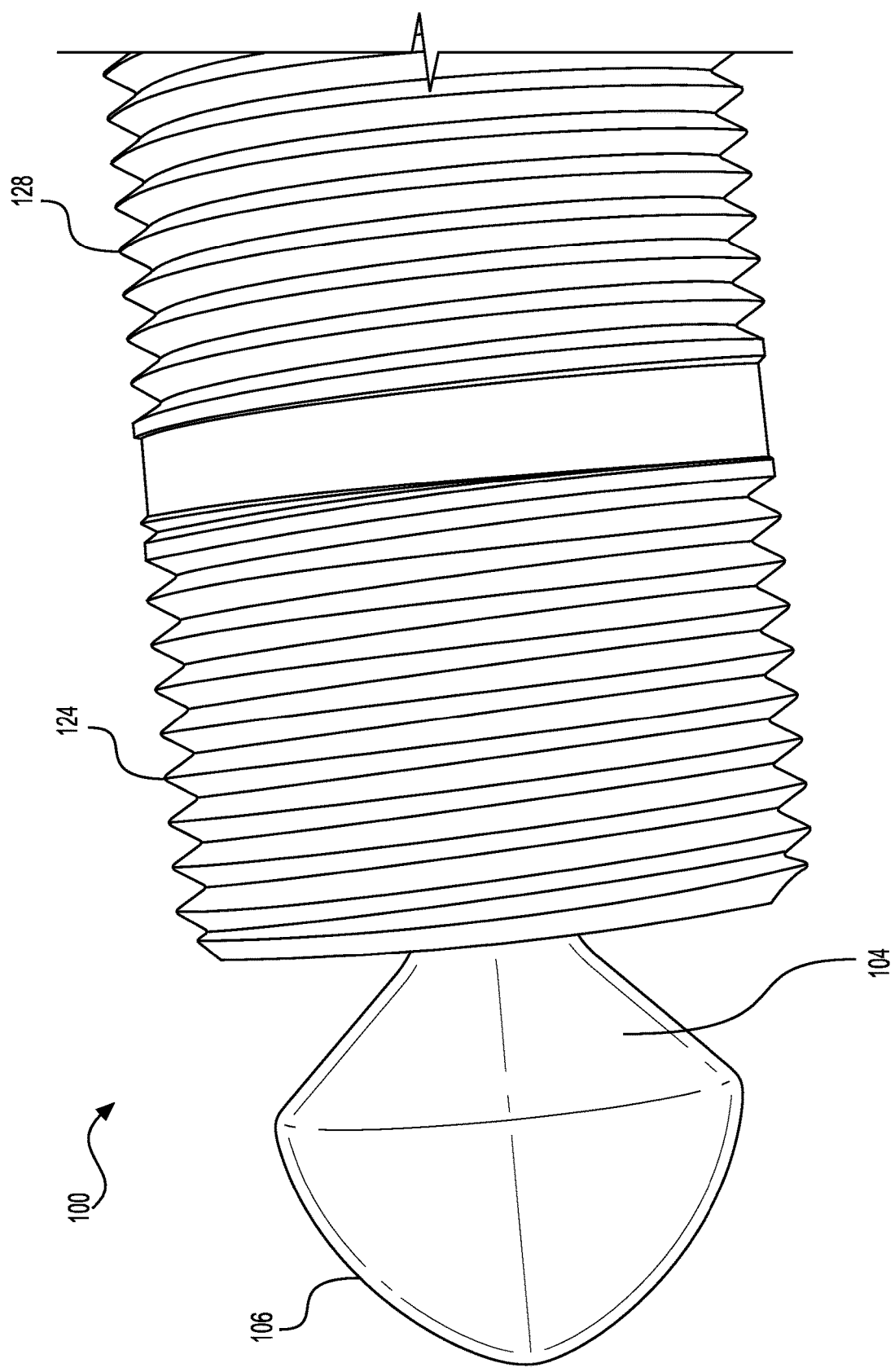
FIG. 1E illustrates a side view of an example embodiment of a check valve in an open position as described herein.

FIG. 1E illustrates a side view of an example embodiment of the check valve 100 in an open position. As shown, in an open position, the dome 106 of the plunger 104 may extend away from the hollow cylindrical body 102 thereby allowing fluid to flow past the plunger 104.

Figure 1F:
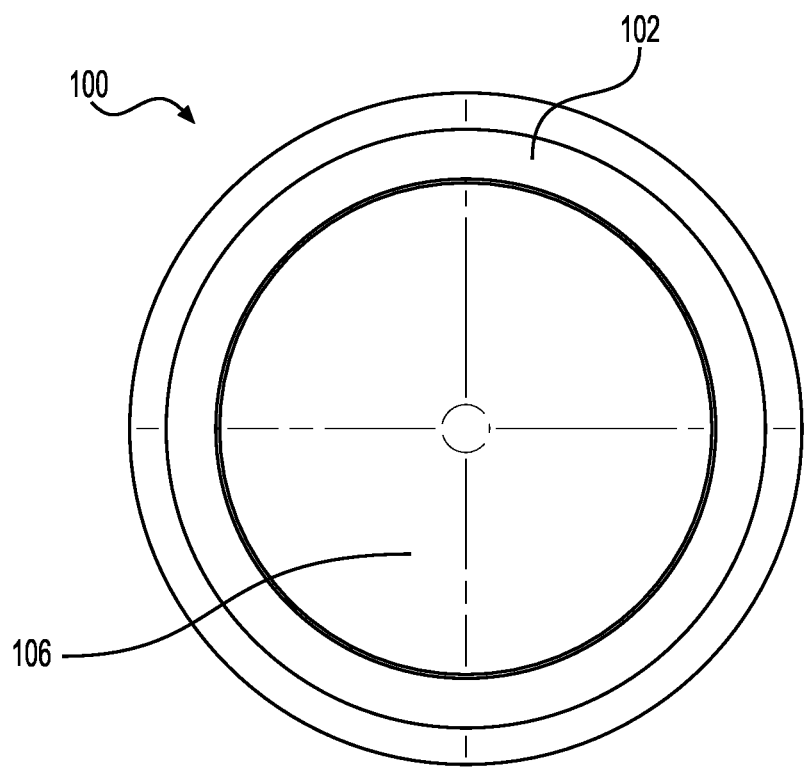
FIG. 1F illustrates an end view of an example embodiment of a check valve in a closed position, as described herein.

FIG. 1F illustrates an end-on view of an example embodiment of the check valve 100 in a closed position. As shown, in a closed position, the dome 106 of the plunger 104 may be in contact with the hollow cylindrical body 102 thereby preventing fluid to flow past the plunger 104 into the hollow cylindrical body 102.

Figure 1G:
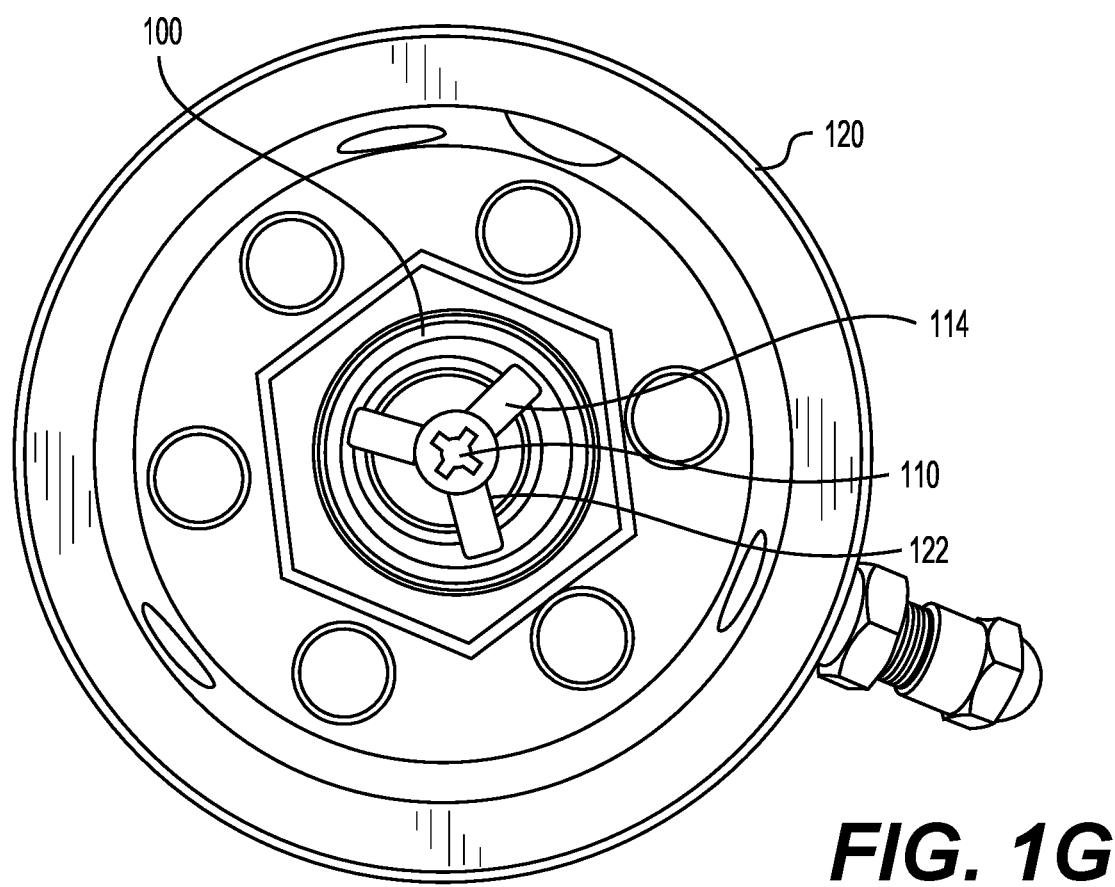
FIG. 1G illustrates an end view of an example embodiment of a check valve coupled with an oil filter adapter as described herein.

FIG. 1G illustrates an end of an example embodiment of the check valve 100 coupled to the oil filter adapter 120. The check valve 100 and the oil filter adapter 120 may be coupled such that a portion of the check valve 100 (e.g., the third exterior portion 128) may be accessible to couple with a removable device, such as an oil filter.

Figure 1H:
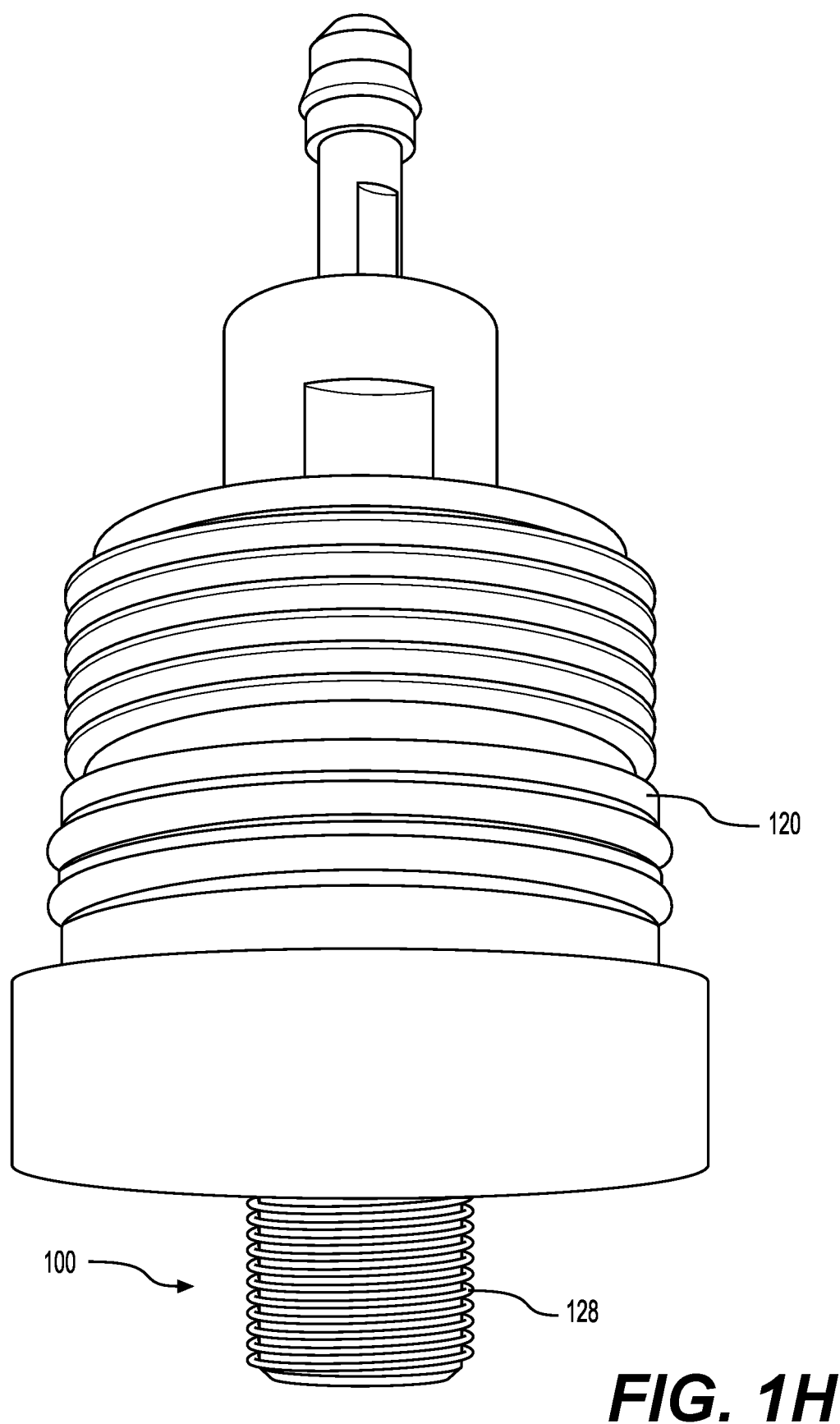
FIG. 1H illustrates a side view of an example embodiment of a check valve coupled with an oil filter adapter as described herein.

FIG. 1H illustrates a side view of an example embodiment of the check valve 100 coupled with an oil filter adapter 120 as described herein. The check valve 100 and the oil filter adapter 120 may be coupled such that a portion of the check valve 100 (e.g., the third exterior portion 128) may be accessible to couple with a removable device, such as an oil filter.

Figure 1I:
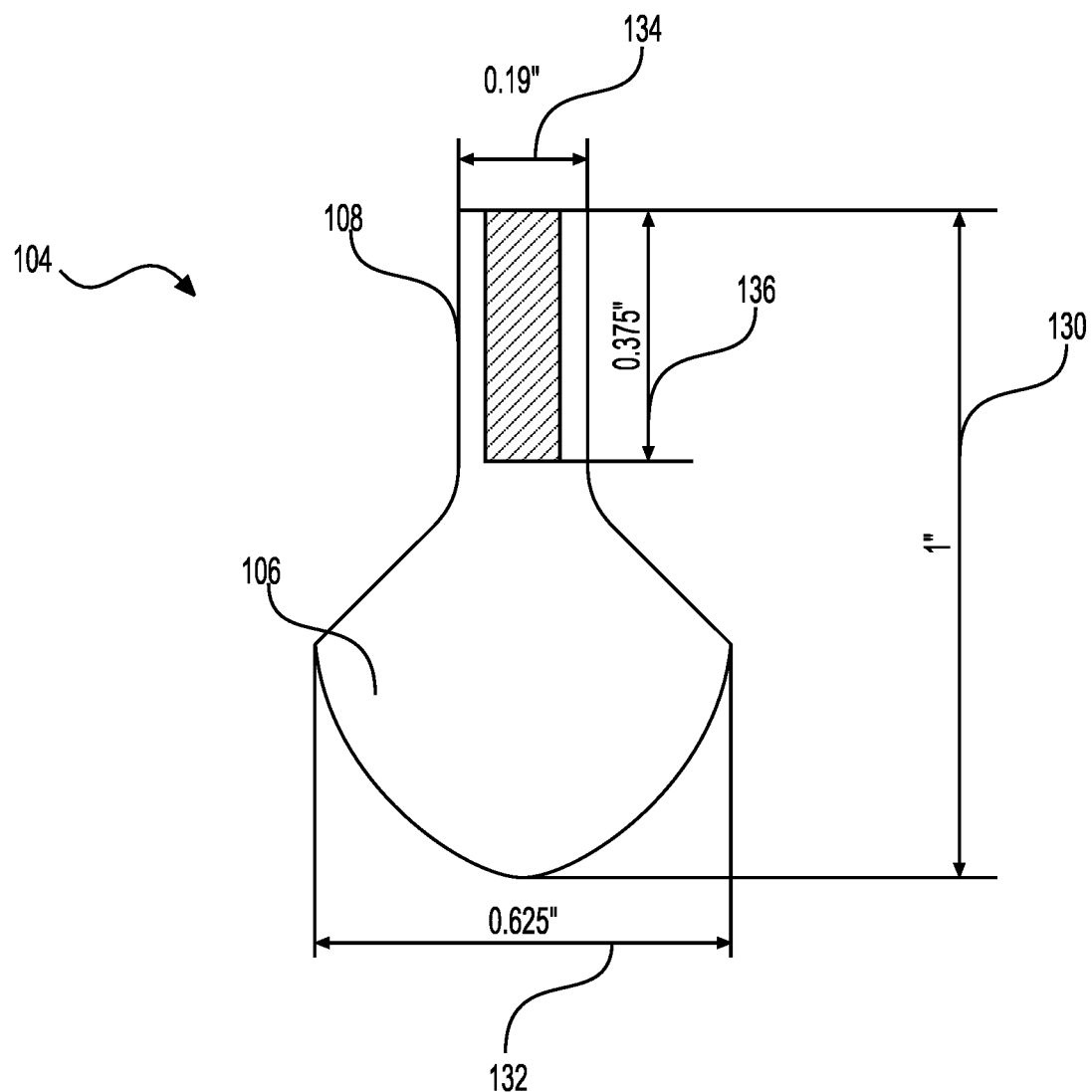
FIG. 1I illustrates a schematic view of an example embodiment of a plunger of a check valve as described herein.

FIG. 1I illustrates an example plunger 104 having an overall length 130 of 1 inch with a dome 106 having a width 132 of 0.625 inches and a stem portion 108 having a width 134 of 0.19 inches. In some examples, the threaded interior portion of the stem portion 108 may recess into the stem portion 108 a length 136 of 0.375 inches. In some examples, the threaded interior portion may include a 6-32 thread per inch (TPI).

While various examples and embodiments are described individually herein, the examples and embodiments may be combined, rearranged and modified to arrive at other variations within the scope of this disclosure.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

CONCLUSION

Although the disclosure describes embodiments having specific structural features and/or methodological acts, it is to be understood that the claims are not necessarily limited to the specific features or acts described. Rather, the specific features and acts are merely illustrative of some embodiments that fall within the scope of claims of the application.

What is claimed is:

1. A check valve comprising:
    a hollow cylindrical body having a first longitudinal end and a second longitudinal end; and
    a plunger comprising:
        a stem slidably disposed at least partially in an interior of the hollow cylindrical body;
        a dome protruding from the hollow cylindrical body and having a circumference larger than a circumference of the hollow cylindrical body;
        a tapered portion interposed between the stem and the dome, the tapered portion including a seat configured such that the seat seals against an opening in the first longitudinal end of the hollow cylindrical body
        a spring located in the interior of the hollow cylindrical body and interposed between the plunger and an interior edge of the hollow cylindrical body;
        a screw inserted through the second longitudinal end and coupled with the stem of the plunger; and
        a plurality of triads coupled with the screw and in contact with an interior wall of the hollow cylindrical body such that the screw may travel linearly through the interior of the hollow cylindrical body.

2. The check valve of claim 1, wherein the plurality of triads comprises a first triad and a second triad that are spaced apart via a spacer, the screw being inserted through a center of the first triad, the second triad, and the spacer.

3. The check valve of claim 2, wherein the first triad, the second triad, and the spacer are a single piece.

4. The check valve of claim 1, further comprising a threaded portion located on an exterior wall of the hollow cylindrical body.

5. The check valve of claim 1, further comprising a first threaded portion located on an exterior wall of the hollow cylindrical body and a second threaded portion located on the exterior wall of the hollow cylindrical body-, the first threaded portion and the second threaded portion being space apart by a smooth portion.

6. The check valve of claim 1, wherein the check valve is configured to operate in a closed position or in an open position and:
    the closed position comprising the seat of the plunger being in contact with the opening in the first longitudinal end of the hollow cylindrical body; and
    the open position comprising the seat of the plunger not being in contact with the opening in the first longitudinal end of the hollow cylindrical body.

7. A method performed by a check valve system comprising:

coupling a check valve to an oil filter adapter, the check valve comprising:
  a hollow cylindrical body having a first longitudinal end and a second longitudinal end; and
  a plunger comprising:
    a stem slidably disposed at least partially in an interior of the hollow cylindrical body;
    a dome protruding from the hollow cylindrical body and having a circumference larger than a circumference of the hollow cylindrical body;
    a tapered portion interposed between the stem and the dome, the tapered portion including a seat configured such that the seat seals against an opening in the first longitudinal end of the hollow cylindrical body;
    a spring located in the interior of the hollow cylindrical body and interposed between the plunger and an interior edge of the hollow cylindrical body;
    a screw inserted through the second longitudinal end and coupled with the stem of the plunger; and
    a plurality of triads coupled with the screw and in contact with an interior wall of the hollow cylindrical body such that the screw may travel linearly through the interior of the hollow cylindrical body.

8. The method of claim 7, wherein the plurality of triads comprises a first triad and a second triad that are spaced apart via a spacer, the screw being inserted through a center of the first triad, the second triad, and the spacer.

9. The method of claim 8, wherein the first triad, the second triad, and the spacer are a single piece.

10. The method of claim 7, further comprising a threaded portion located on an exterior wall of the hollow cylindrical body.

11. The method of claim 7, further comprising a first threaded portion located on an exterior wall of the hollow cylindrical body and a second threaded portion located on the exterior wall of the hollow cylindrical body, the first threaded portion and the second threaded portion being space apart by a smooth portion.

12. The method of claim 7, wherein the check valve is configured to operate in a closed position or in an open position and:
  the closed position comprising the seat of the plunger being in contact with the opening in the first longitudinal end of the hollow cylindrical body; and
  the open position comprising the seat of the plunger not being in contact with the opening in the first longitudinal end of the hollow cylindrical body.

13. A system comprising:
  a check valve comprising:
    a hollow cylindrical body having a first longitudinal end and a second longitudinal end; and
    a plunger comprising:
      a stem slidably disposed at least partially in an interior of the hollow cylindrical body;
      a dome protruding from the hollow cylindrical body and having a circumference larger than a circumference of the hollow cylindrical body;
      a tapered portion interposed between the stem and the dome, the tapered portion including a seat configured such that the seat seals to seal against an opening in the first longitudinal end of the hollow cylindrical body;
      a spring located in the interior of the hollow cylindrical body and interposed between the plunger and an interior edge of the hollow cylindrical body;
      a screw inserted through the second longitudinal end and coupled with the stem of the plunger; and
      a plurality of triads coupled with the screw and in contact with an interior wall of the hollow cylindrical body such that the screw may travel linearly through the interior of the hollow cylindrical body.

14. The system of claim 13, wherein the plurality of triads comprises a first triad and a second triad that are spaced apart via a spacer, the screw being inserted through a center of the first triad, the second triad, and the spacer.

15. The system of claim 14, wherein the first triad, the second triad, and the spacer are a single piece.

16. The system of claim 13, further comprising a threaded portion located on an exterior wall of the hollow cylindrical body.

17. The system of claim 13, wherein the check valve is configured to operate in a closed position or in an open position and:
  the closed position comprising the seat of the plunger being in contact with the opening in the first longitudinal end of the hollow cylindrical body; and the open position comprising the seat of the plunger not being in contact with the opening in the first longitudinal end of the hollow cylindrical body.

* * * * *